United States Patent
Hiroshi

(10) Patent No.: US 8,076,812 B2
(45) Date of Patent: Dec. 13, 2011

(54) ROTOR HAVING EMBEDDED PERMANENT MAGNET

(75) Inventor: Nishimura Hiroshi, Chiba (JP)

(73) Assignees: Hyundai Motor Company, Seoul (KR); Hyundai Motor Japan R&D Center, Inc., Chiba (JP); Kia Motors Corporation, Seoul (KR)

( * ) Notice: Subject to any disclaimer, the term of this patent is extended or adjusted under 35 U.S.C. 154(b) by 189 days.

(21) Appl. No.: 12/554,833

(22) Filed: Sep. 4, 2009

(65) Prior Publication Data

US 2010/0225191 A1    Sep. 9, 2010

(30) Foreign Application Priority Data

Mar. 6, 2009 (JP) .................................. 2009-053240

(51) Int. Cl.
*H02K 21/12* (2006.01)
(52) U.S. Cl. .............................. 310/156.38; 310/156.31
(58) Field of Classification Search ............ 310/156.38, 310/156.51–156.53
See application file for complete search history.

(56) References Cited

U.S. PATENT DOCUMENTS

| | | | |
|---|---|---|---|
| 5,654,600 A * | 8/1997 | Nomura et al. | 310/68 B |
| 6,906,444 B2 * | 6/2005 | Hattori et al. | 310/156.53 |
| 7,148,597 B2 * | 12/2006 | Matsunobu et al. | 310/156.45 |
| 7,417,346 B2 * | 8/2008 | Matsunobu et al. | 310/156.45 |
| 7,800,272 B2 * | 9/2010 | Nakayama et al. | 310/156.56 |
| 2003/0011265 A1 * | 1/2003 | Hattori et al. | 310/156.38 |
| 2003/0038561 A1 * | 2/2003 | Wauke | 310/216 |
| 2008/0247689 A1 * | 10/2008 | Nomura et al. | 384/129 |
| 2009/0261679 A1 * | 10/2009 | Sakai et al. | 310/156.53 |

FOREIGN PATENT DOCUMENTS

| | | |
|---|---|---|
| JP | 07-231589 | 8/1995 |
| JP | 2000-092763 | 3/2000 |
| JP | 2000-228838 | 8/2000 |
| JP | 2002-335643 | 11/2002 |
| JP | 2007-092804 | 4/2007 |
| JP | 2007-104617 | 4/2007 |

* cited by examiner

*Primary Examiner* — Thanh Lam
(74) *Attorney, Agent, or Firm* — Edwards Wildman Palmer LLP; Peter F. Corless

(57) ABSTRACT

A structure for arranging a permanent magnet suitable for a rotor core having a thin, circular, hollow ring section and a structure for reducing the amount of the permanent magnet are provided.

10 Claims, 4 Drawing Sheets

ROTOR HAVING EMBEDDED PERMANENT MAGNET

CROSS-REFERENCE TO RELATED APPLICATION

This application claims the benefit of Japanese Patent Application No. 2009-053240, filed on Mar. 6, 2009, the entire disclosure of which is hereby incorporated by reference.

BACKGROUND OF THE INVENTION

1. Field of the Invention

The present invention relates, in general, to a rotor having an embedded permanent magnet, and more particularly, to a structure comprising a permanent magnet suitable for a rotor core preferably having a thin, circular, hollow section and a structure which suitably reduces the amount of permanent magnet.

2. Description of the Related Art

Generally, a synchronous motor using a permanent magnet (or a magnet) preferably includes a surface permanent magnet (SPM) type motor in which a permanent magnet is suitably attached onto the surface of a rotor, and an interior permanent magnet (IPM) type motor in which a permanent magnet is suitably embedded into a core of a rotor. The IPM type motor is generally used because the SPM type motor has a complicated structure for preventing the magnet from being scattered at fast rotation speeds whereas the IPM type motor has a relatively simple structure. Preferably, the IPM type motor is also used as a motor for driving a hybrid car.

Japanese Unexamined Patent Publication No. 2000-316241, incorporated by reference in its entirety herein, discloses an example of an IPM motor in which a pole of a rotor is preferably composed of magnets having a two-stage, 3-divided, substantially U-shaped arrangement. Japanese Unexamined Patent Publication No. 2004-88846, incorporated by reference in its entirety herein, discloses another example of an IPM motor in which a pole of a rotor is preferably composed of magnets having a single-stage, 3-divided, substantially U-shaped arrangement. Preferably, the net torque for rotating an IPM motor is suitably expressed as the sum of attractive (or repulsive) magnetic torque between embedded magnets and an electromagnet of a coil as a pole of a stator and magneto-resistance torque generated, owing to a difference between dielectric coefficients of magnets and a metallic section such as a silicon steel plate in a pole of a rotor.

IPM motors as described in the art can obtain suitably high torque owing to a substantially U-shaped arrangement of the magnets, but the diameter of the rotor needs to be suitably increased making it difficult to make them compact.

Further, a motor for a hybrid car requires a structure for assembling a connection mechanism to a crank shaft or a transmission, i.e. an existing mass-produced driving system. Accordingly, the rotor core thereof has a circular hollow section with the center being largely empty and thus a conventional V or U shaped arrangement of permanent magnets cannot be suitably obtained. Therefore, an arrangement of magnets for high performance and efficiency is suitably required.

Further, since a rare metal such as niobium as a high coercive magnet is expensive, in order to reduce costs, a structure for reducing the amount of magnets to be used is also required.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention is directed to a rotor for a hybrid car, particularly where the preferred structure of arranging a permanent magnet suitable for a rotor core having a thin, circular, hollow section and a preferred structure that reduces the amount of the permanent magnet.

According to one aspect of the present invention, a magnet-embedded rotor is provided in a motor in which planar permanent magnets are circumferentially arranged at regular intervals in a cylindrical rotor core, and in which electrolytic galvanized iron plates are preferably laminated on one another, with outer circumferential surfaces of the permanent magnets being suitably arranged so as to become alternating poles of N and S, wherein the permanent magnets preferably have a 3-part arrangement including a center magnet and two side magnets, a width of a polar surface of each side magnet being smaller than that of the center magnet, and further wherein the arrangement is preferably constituted such that the magnets are suitably embedded in the rotor core so as to be parallel with a tangential line thereof, a width between both poles of the center magnet is smaller than those of the side magnets, and a volume of the pole-front side core from the outer circumference of the rotor core to the polar surface of the center magnet is suitably increased so that the respective polar surfaces of the side magnets are preferably inclined towards the center magnet.

In a preferred embodiment, the polar surface of the center magnet facing towards an inner circumference of the rotor core may preferably be at least aligned with a line connecting those of the side magnets towards the inner circumference, or may be suitably arranged towards the outer circumference of the rotor core.

In a preferred embodiment, the center magnet may be a permanent magnet having a suitably smaller coercive force than the side magnets and composed of lower amount of rare metal than the side magnets.

In other further embodiments, according to the magnet-embedded rotor of the present invention, the width between the magnetic poles of the center magnet is made suitably less than that of the side magnets, accordingly reducing the amount of magnet used. Accordingly, the reduction in width of the center magnet allows the volume of the pole-front side core from the outer circumference of the rotor core to the polar surface of the center magnet to increase, which causes magneto-resistance torque to suitably increase, thereby maintaining the torque while reducing the amount of magnet. In further embodiments, the output characteristic can be maintained, the amount of the magnets used can be reduced by about 12% as compared to that of the prior art, and thus the manufacturing cost can be reduced. In certain preferred embodiments, the center magnet and the side magnets are preferably embedded in a substantially linear form in the rotor core parallel with the tangential line of the outer circumference thereof, so that a multi-pole and high torque motor can be suitably realized using the rotor core even having the circular, thin section with a large hollow center portion.

In further embodiments, owing to the arrangement in which the respective polar surfaces of the side magnets are suitably inclined towards the center magnet, magnetic fluxes from an electromagnet (stator coil) can smoothly pass through the pole-front side core from the outer circumference of the rotor core to the polar surface of the center magnet without being blocked by the side magnets, thereby suitably enabling the magneto-resistance torque in the pole-front side core to be considerably increased.

In further embodiments, owing to the arrangement in which the polar surface of the center magnet towards an inner circumference of the rotor core is at least aligned with a line connecting those of the side magnets towards the inner circumference, or is arranged towards the outer circumference of the rotor core, because of the center magnet, the magnetic permeability of the pole-rear side core from the inner circumference of the rotor core to the rear-side polar surface of the center magnet is not blocked so that a magnetic path through the pole-rear side core is suitably secured and the magnetic fluxes are not saturated in the magnet, resulting in suitably maintaining the output of a motor even though the amount of center magnet used has been reduced.

According to further embodiments, owing to the preferred arrangement in which the center magnet is a permanent magnet having a smaller coercive force than the side magnets and suitably composed of a lower amount of rare metal than the side magnets, the cost of the magnet and therefore the motor can be suitably reduced. In addition, because the amount of a reverse magnetic field applied onto the pole center portion is suitably small, it is not necessary to maintain high magnetic force in the pole center portion, and there is no effect on the output characteristics of a motor.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

As described herein, the present invention includes a magnet-embedded rotor in a motor comprising planar permanent magnets, wherein the magnets are circumferentially arranged at regular intervals in a cylindrical rotor core, and wherein electrolytic galvanized iron plates are laminated on one another.

In one embodiment, the outer circumferential surfaces of the permanent magnets are arranged so as to become alternating poles of N and S.

In one embodiment, the permanent magnets further comprise a 3-part arrangement including a center magnet and two side magnets.

In another embodiment, the width of a polar surface of each side magnet is smaller than that of the center magnet.

In another further embodiments, the magnets are embedded in the rotor core so as to be parallel with a tangential line thereof, and a width between both poles of the center magnet is smaller than those of the side magnets, and a volume of the pole-front side core from an outer circumference of the rotor core to a polar surface of the center magnet is increased so that the respective polar surfaces of the side magnets are inclined towards the center magnet.

In still another embodiment, the polar surface of the center magnet towards an inner circumference of the rotor core is at least aligned with a line connecting the polar surfaces of the side magnets towards the inner circumference, or is arranged towards the outer circumference of the rotor core.

The invention also features a motor vehicle comprising the magnet embedded rotor of any one of the aspects described herein. Reference will now be made in greater detail to preferred embodiments of the present invention, examples of which are illustrated in the accompanying drawings.

Figure 1:
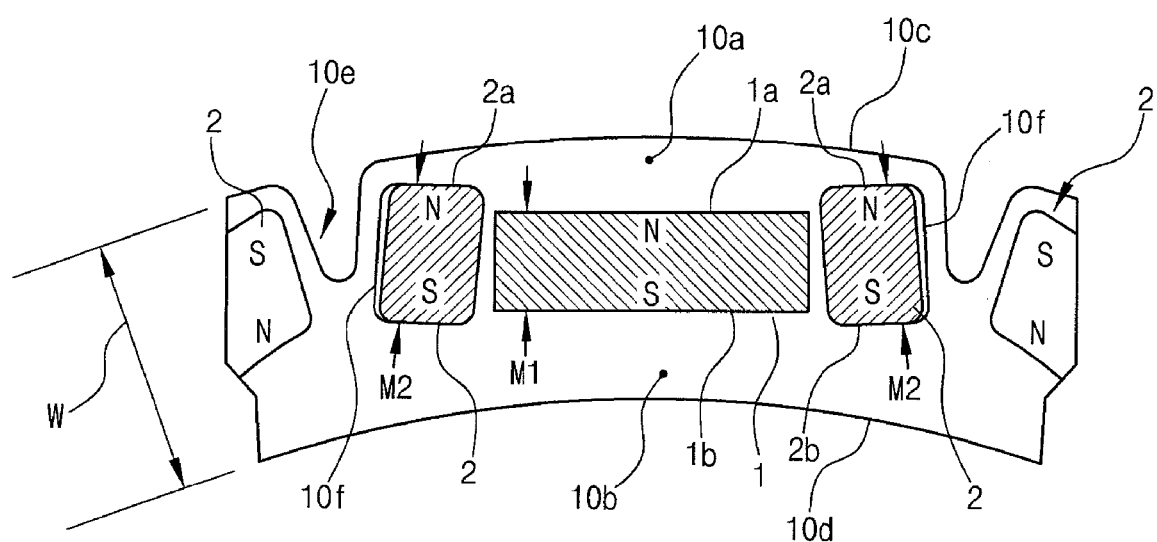
FIG. 1 is a partial cross-sectional view illustrating a rotor core of a magnet-embedded rotor according to a preferred embodiment of the present invention.

FIG. 1 is a partial cross-sectional view illustrating a rotor core of a magnet-embedded rotor according to a preferred embodiment of the present invention.

As shown in FIG. 1, a portion of an axially vertical section of planar permanent magnets are preferably circumferentially arranged at regular intervals in a rotor core 10, in which electrolytic galvanized iron plates are suitably on one another, with the outer circumferential surfaces thereof being preferably arranged so as to become alternating poles of N and S.

In preferred embodiments of the invention, the rotor core 10 is suitably of a circular ring section, a center of which is greatly hollow. W denotes a thick portion of the ring section. 10c denotes an outer circumference of the core, and 10d denotes an inner circumference of the core. Preferably, the outer circumference 10c of the core is provided with anti-short grooves 10e for preventing a short of magnetic flux between adjacent permanent magnets. In further embodiments, inside the ring section, substantially rectangular magnet-insert holes 10f into which planar permanent magnets can be axially inserted are suitably provided parallel with a tangential line of the outer circumference 10c of the core.

In preferred embodiments of the present invention, a permanent magnet of one pole is suitably divided into three parts, a center magnet 1 and two side magnets 2, a width of a polar surface of each side magnet being smaller than that of the center magnet 1.

In a preferred embodiment, as shown in FIG. 1, the polar surfaces 1a and 2a of the center and side magnets 1 and 2 in the side of the outer circumference 10c of the core suitably assume an N pole, and those 1b and 2b in the side of the inner circumference 10d of the core suitably assume a S pole. Permanent magnets neighboring the set of the magnets suitably assume opposite magnetic poles to the above poles.

In other further embodiments, a width M1 between the magnetic poles of the center magnet 1 is suitably thinner than those M2 of the side magnets 2 so that a volume of a pole-front side core 10*a* from the outer circumference 10*c* of the core to the polar surface 1*a* of the center magnet 1 is suitably increased.

Further, while owing to thinning of the width M1 of the center magnet 1, torque of the magnet is suitably reduced, magneto-resistance torque is suitably increased owing to an increase in the volume of the pole-front side core 10*a*. Preferably employed is a design optimal for maintaining torque in a motor using the sum of the torque.

Figure 2:
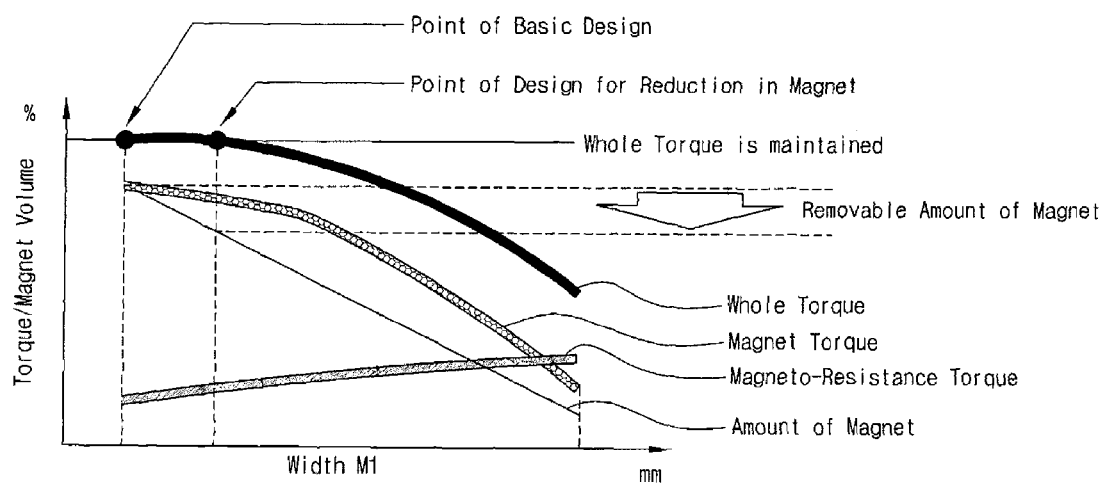
FIG. 2 is a concept diagram illustrating torque components of the magnet-embedded motor.

According to further embodiments, and as shown in FIG. 2, is a concept diagram illustrating torque components of the magnet-embedded motor, wherein a horizontal axis suitably indicates a width M1 of the magnet which is gradually smaller from a point of a basic design towards a right side in the horizontal axis, and a vertical axis suitably indicates torque/volume of the magnet. Preferably in the vertical axis, in connection with the reduction in the torque of the magnet, an increase in the magneto-resistance torque owing to an increase in a volume of the pole-front side core and whole torque of the magnet torque+the magneto-resistance torque are suitably indicated. As shown in the figure, if the amount of a magnet used is suitably reduced in the basic design, it can be seen that the whole torque is suitably maintained within a certain range.

According to certain preferred embodiments of the invention, the thinning of the center magnet 1 and the increasing of the volume of the pole-front side core 10*a* allow the maintenance of torque-output and a reduction in the amount of magnet used and costs. According to further embodiments, the amount of magnet used was suitably reduced by about 12%, and the original torque could be maintained with a design of reduction in the amount of the magnet (magnet torque 89%+magneto-resistance torque 11%) relative to a basic design (magnet torque 93%+magneto-resistance torque 7%).

Preferably, while the center magnet 1 is suitably embedded in the core parallel with a tangential line of the outer circumference 10*a* of the core, the respective side magnets 2 are suitably embedded inclined towards the center magnet 1, i.e. in an inner direction. In certain exemplary embodiments, in the present embodiment, an inclination angle about the center magnet 1 is 5°.

According to certain exemplary embodiments, in order to increase the magneto-resistance torque, it is required to preferably increase a difference in attractive forces generated between when an electromagnet (stator coil) suitably disposed on an outer circumference of a rotor directly faces the laminated iron plates of the rotor core and when it directly faces the permanent magnets in the rotor. Accordingly, the permanent magnet itself has very high magneto-resistance so that when the electromagnet and the permanent magnet face each other, even in any shape and arrangement, most magnetic flux cannot pass through there. Accordingly, in order to suitably increase the difference in the attractive forces, it is required to determine the shapes of the permanent magnets and the laminated iron plates and suitably optimize the arrangement of that construction such that the magnetic flux from the electromagnet (stator coil) can preferably pass through there when the electromagnet directly faces the laminated iron plates.

Figure 3:
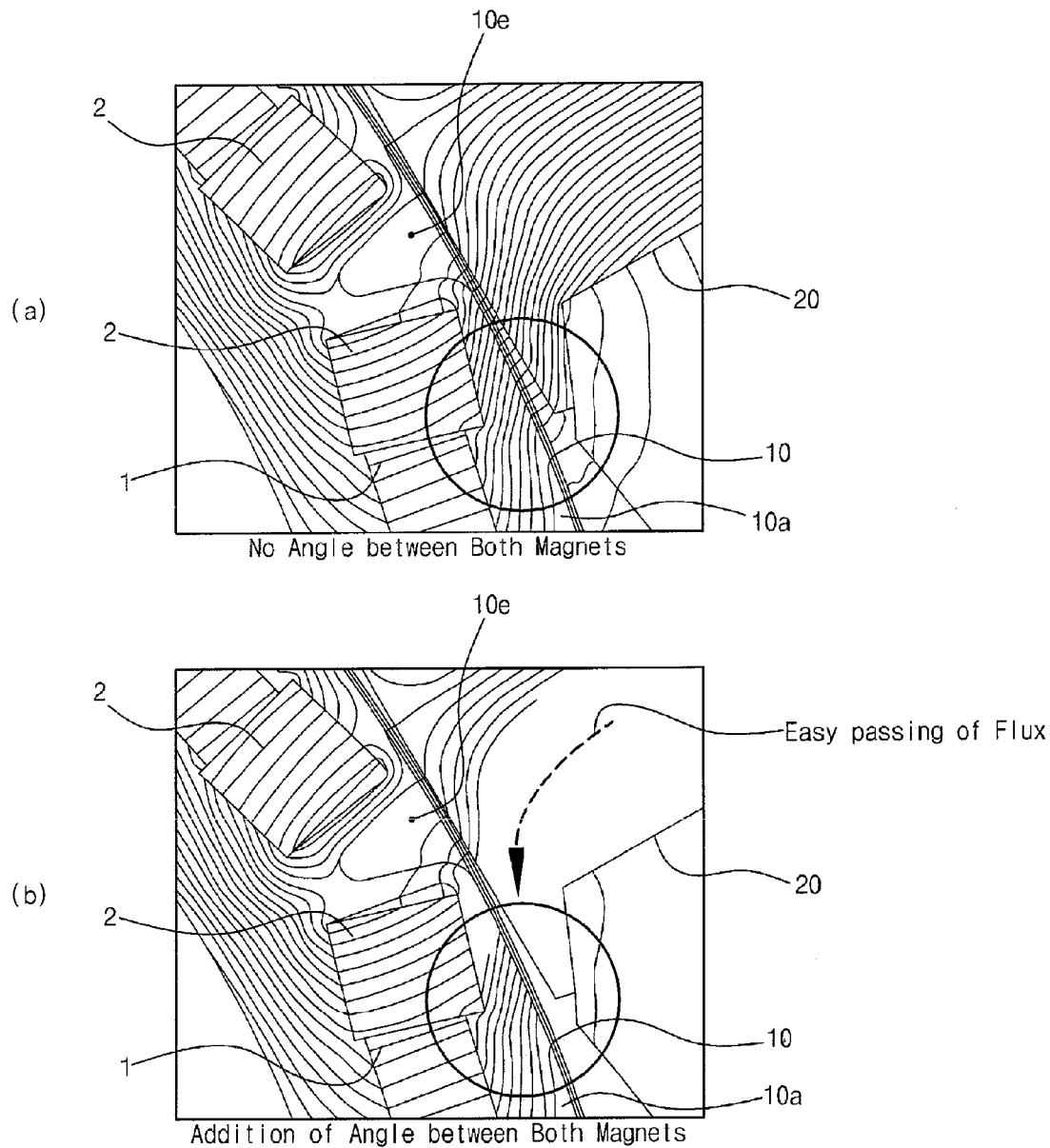
FIG. 3 is a schematic of views illustrating a difference of the magnetic permeabilities through a rotor core according to an angle of side magnets, wherein an upper figure (a) illustrates the magnetic permeability upon no angle between the magnets and a lower figure (b) illustrates that upon addition of an angle between them.

FIG. 3 is a schematic of views illustrating a difference of the magnetic permeabilities through a rotor core according to an angle of side magnets, wherein the upper figure (a) illustrates the magnetic permeability upon no angle between the magnets and the lower figure (b) illustrates that upon addition of an angle between them. As shown in FIG. 3(*b*), both side magnets 2 are preferably arranged in a suitably inclined form, so that the magnetic fluxes from the outer circumference 10*c* of the core to the polar surface 1*a* of the center magnet 1 can smoothly pass through there.

In further preferred embodiments, for example as shown in the case of FIG. 3(*b*) where both side magnets 2 are suitably inclined as compared to the case of FIG. 3(*a*), the magnetic flux to be blocked is suitably reduced, and that from the electromagnet (stator coil) 20 can smoothly pass through.

Figure 4:
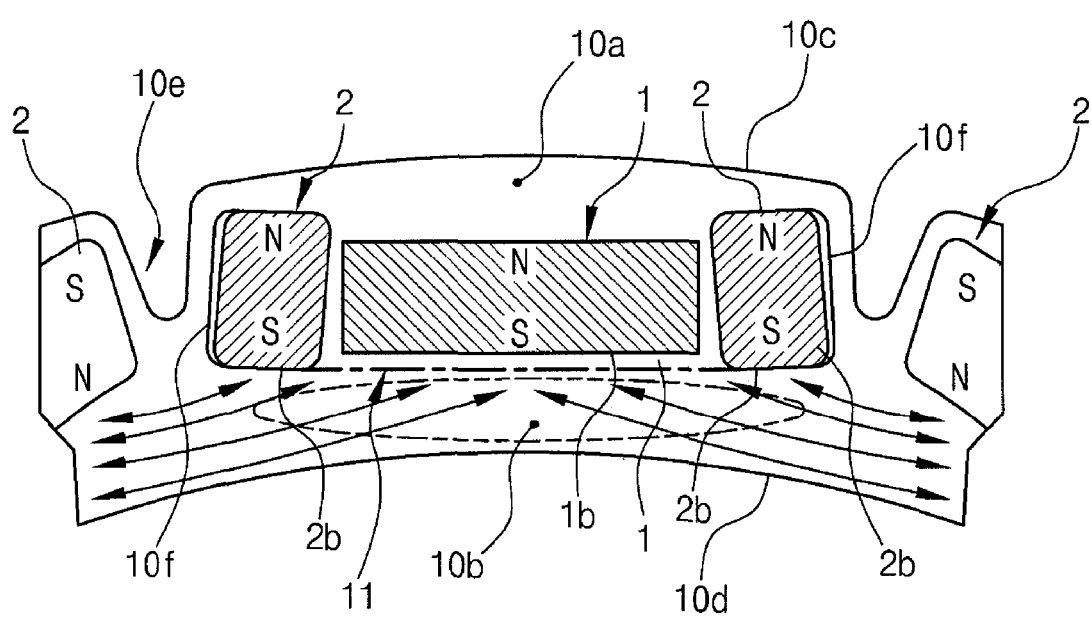
FIG. 4 is a view illustrating an arrangement of the polar surfaces of the center magnet and the side magnets towards the inner circumference of the rotor core.

FIG. 4 is an exemplary view illustrating a preferred arrangement of the polar surfaces of the center magnet and the side magnets towards the inner circumference of the rotor core.

For example, in preferred embodiments and s illustrated in FIG. 4, the polar surface 1*b* of the center magnet 1 towards the inner circumference of the rotor core 10 is preferably at least aligned with a line 11 connecting the polar surfaces 2*b* of the side magnets 2 towards the inner circumference, or is preferably arranged towards the outer circumference 10*c* of the rotor core 10, thereby suitably preventing the center magnet 1 from blocking the magnetic permeability of the pole-rear side core 10*b*.

Accordingly, in such an arrangement, while if the center magnet 1 is suitably disposed towards the inner circumference of the rotor core 10, the magneto-resistance torque of the pole-front side core 10*a* is suitably increased, a magnetic path through the pole-rear side core 10*b* is narrowed and the magnetic fluxes are saturated in the magnet, resulting in a reduction in magnet torque. To prevent this, according to the present invention, the center magnet 1 is suitably arranged towards the outer circumference of the core from the line 11 connecting the polar surfaces 2*b* of the side magnets 2 in the side of the inner circumference of the core.

In other further embodiments, the center magnet 1 is a permanent magnet having a suitably smaller coercive force than the side magnets 2 and preferably composed of lower amount of rare metal than the side magnets, resulting in suitable reduction in the costs of the magnet.

In further embodiments, in designing a motor, if a magnetic field of an electromagnet (stator coil) is excessive, or the coercive force of a permanent magnet is suitably small, irreversible demagnetizing occurs so that the torque cannot be suitably maintained. Preferably, while the design is made such that it is capable of dealing with the maximum loading state in order to prevent this, in the case of a motor for a hybrid car, which requires strict dimension tolerance, an expensive, high-coercive permanent magnet, which is less changed in shape of the part and coil specification, and has higher amount of rare metal, was preferably used as a solution.

According to preferred embodiments of the present invention, as a reverse magnetic field applied onto the permanent magnet becomes gradually smaller towards the center portion of the magnet 1 so that it is not necessary to maintain high magnetic force in the pole center portion, a permanent magnet having a smaller coercive force and composed of lower rare metal so as to reduce the consumption of rare metal and the costs is preferably used as the center magnet 1.

In further preferred embodiments, a permanent magnet having remaining flux density of 1.16~1.24 T and coercive force of 2387 KA/m or more is used as the side magnet, and a permanent magnet having the remaining flux density of 1.24~1.31 T and coercive force of 1671 KA/m or more is preferably used as the center magnet 1, resulting in cost reduction.

Consequently, according to preferred embodiments of the present invention, in the case of a 15 kW motor, the costs of the magnet can be suitably reduced by about 10%, and the magnet-embedded rotor is preferably provided which has a thin, circular ring section and is very suitable for a hybrid car.

Preferred embodiments of the present invention have been described for illustrative purposes, and those skilled in the art will appreciate that various modifications, additions and substitutions are possible, without departing from the scope and spirit of the invention as disclosed in the accompanying claims.

What is claimed is:

1. A magnet-embedded rotor in a motor in which planar permanent magnets are circumferentially arranged at regular intervals in a cylindrical rotor core, in which electrolytic galvanized iron plates are laminated on one another, with outer circumferential surfaces of the permanent magnets being arranged so as to become alternating poles of N and S,
    wherein the permanent magnets have a 3-part arrangement including a center magnet and two side magnets, a width of a polar surface of each side magnet being smaller than that of the center magnet, and
    the arrangement is constituted such that the magnets are embedded in the rotor core so as to be parallel with a tangential line thereof, a width between both poles of the center magnet is smaller than those of the side magnets, and a volume of the pole-front side core from an outer circumference of the rotor core to a polar surface of the center magnet is increased so that the respective polar surfaces of the side magnets are inclined towards the center magnet.

2. The magnet-embedded rotor according to claim 1, wherein the polar surface of the center magnet towards an inner circumference of the rotor core is at least aligned with a line connecting the polar surfaces of the side magnets towards the inner circumference, or is arranged towards the outer circumference of the rotor core.

3. The magnet-embedded rotor according to claim 1, wherein the center magnet is a permanent magnet having a smaller coercive force than the side magnets and composed of lower amount of rare metal than the side magnets.

4. A magnet-embedded rotor in a motor comprising planar permanent magnets, wherein the magnets are circumferentially arranged at regular intervals in a cylindrical rotor core, and wherein electrolytic galvanized iron plates are laminated on one another,
    wherein the magnets are embedded in the rotor core so as to be parallel with a tangential line thereof, and a width between both poles of the center magnet is smaller than those of the side magnets, and a volume of the pole-front side core from an outer circumference of the rotor core to a polar surface of the center magnet is increased so that the respective polar surfaces of the side magnets are inclined towards the center magnet.

5. The magnet embedded rotor of claim 4, wherein the outer circumferential surfaces of the permanent magnets are arranged so as to become alternating poles of N and S.

6. The magnet-embedded rotor of claim 4, wherein the permanent magnets further comprise a 3-part arrangement comprising a center magnet and two side magnets.

7. The magnet-embedded rotor of claim 6, wherein a width of a polar surface of each side magnet is smaller than that of the center magnet.

8. The magnet-embedded rotor according to claim 4, wherein the polar surface of the center magnet towards an inner circumference of the rotor core is at least aligned with a line connecting the polar surfaces of the side magnets towards the inner circumference, or is arranged towards the outer circumference of the rotor core.

9. A motor vehicle comprising the magnet embedded rotor of claim 1.

10. A motor vehicle comprising the magnet embedded rotor of claim 4.

* * * * *